(12) United States Patent
Pettinelli, Jr. et al.

(10) Patent No.: US 9,753,720 B2
(45) Date of Patent: *Sep. 5, 2017

(54) UNIVERSAL CONNECTIVITY FOR NON-UNIVERSAL DEVICES

(71) Applicant: Hand Held Products, Inc., Fort Mill, SC (US)

(72) Inventors: John A. Pettinelli, Jr., Camillus, NY (US); John Izzo, Auburn, NY (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/143,645

(22) Filed: May 2, 2016

(65) Prior Publication Data

US 2016/0246588 A1    Aug. 25, 2016

Related U.S. Application Data

(63) Continuation of application No. 14/566,070, filed on Dec. 10, 2014, now Pat. No. 9,332,531, which is a
(Continued)

(51) Int. Cl.
*G06F 9/44* (2006.01)
*G06F 9/445* (2006.01)
(Continued)

(52) U.S. Cl.
CPC ........... *G06F 8/65* (2013.01); *G06K 7/10336* (2013.01); *G06K 7/10386* (2013.01);
(Continued)

(58) Field of Classification Search
CPC .... G06F 8/65; G06F 8/67; G06F 8/68; G06K 7/10336; H04L 67/34; H04L 67/125
(Continued)

(56) References Cited

U.S. PATENT DOCUMENTS 6,947,612 B2   9/2005 Helms et al.
7,093,760 B1   8/2006 Collins, Jr.
(Continued)

FOREIGN PATENT DOCUMENTS

EP   1760958 A2   3/2007
EP   2280525      2/2011
(Continued)

OTHER PUBLICATIONS

Office Action in counterpart Japanese Application No. 2010-149074 dated Dec. 2, 2016, pp. 1-5 [U.S. Pat. No. 7,093,760 and JP Pub. No. 09-91222 previously cited].
(Continued)

*Primary Examiner* — Anna Deng
(74) *Attorney, Agent, or Firm* — Additon, Higgins & Pendleton, P.A.

(57) ABSTRACT

A system includes at least one data collection device connected to a corresponding data terminal via a primary communication channel; and a central connectivity point connected to each data collection device via a wireless secondary communication channel so as to communicate with the at least one data collection device without disrupting communication between the at least data collection device and the corresponding data terminal via the primary communication channel and to permit remote administration of each data collection device.

17 Claims, 7 Drawing Sheets

Related U.S. Application Data continuation of application No. 12/825,714, filed on Jun. 29, 2010, now Pat. No. 8,914,788.

(60) Provisional application No. 61/222,284, filed on Jul. 1, 2009.

(51) Int. Cl.
*G06K 7/10* (2006.01)
*H04L 29/08* (2006.01)
*H04W 72/04* (2009.01)
*H04W 4/00* (2009.01)
*H04W 88/06* (2009.01)

(52) U.S. Cl.
CPC ........ *G06K 7/10712* (2013.01); *H04L 67/125* (2013.01); *H04L 67/34* (2013.01); *H04W 4/008* (2013.01); *H04W 72/04* (2013.01); *H04W 72/0453* (2013.01); *H04W 88/06* (2013.01)

(58) Field of Classification Search
USPC .................................................. 717/168, 171
See application file for complete search history.

(56) References Cited

U.S. PATENT DOCUMENTS

| | | |
|---|---|---|
| 7,137,559 B2 | 11/2006 | Watanabe et al. |
| 7,164,674 B2 | 1/2007 | Shpak |
| 7,233,784 B2 | 6/2007 | Himeno |
| 8,005,504 B2 | 8/2011 | Sano et al. |
| 8,914,788 B2 | 12/2014 | Pettinelli et al. |
| 9,332,531 B2 | 5/2016 | Pettinelli et al. |
| 2002/0112041 A1 | 8/2002 | Viscount et al. |
| 2003/0222150 A1 | 12/2003 | Sato et al. |
| 2004/0164156 A1 | 8/2004 | Watanabe et al. |
| 2005/0001036 A1* | 1/2005 | Blake ................ G06K 7/10851 235/462.37 |
| 2005/0243364 A1 | 11/2005 | Sakai et al. |
| 2005/0272505 A1* | 12/2005 | Okamura ................ A63F 13/10 463/42 |
| 2006/0250276 A1 | 11/2006 | Levinson |
| 2007/0129104 A1 | 6/2007 | Sano et al. |
| 2007/0284441 A1* | 12/2007 | Walczyk .............. G06Q 20/202 235/383 |
| 2008/0069073 A1 | 3/2008 | Sano |
| 2009/0064128 A1* | 3/2009 | Majmundar ............ H04W 4/06 717/172 |
| 2010/0235921 A1* | 9/2010 | Foster ................ G06Q 20/3829 726/26 |
| 2011/0042898 A1* | 2/2011 | Downs, III .............. A63F 1/14 273/292 |

FOREIGN PATENT DOCUMENTS

| | | |
|---|---|---|
| JP | 09091222 | 4/1997 |
| JP | 2000-276350 A | 10/2000 |
| JP | 2000276350 A | 10/2000 |
| JP | 2002-189590 A | 7/2002 |
| JP | 2004-252894 A | 9/2004 |
| JP | 2005-198021 A | 7/2005 |
| JP | 2006-520137 | 8/2006 |
| JP | 2007-142684 A | 6/2007 |
| JP | 2008-72488 A | 3/2008 |
| JP | 2011060271 A | 3/2011 |
| WO | 2004/075455 A2 | 9/2004 |

OTHER PUBLICATIONS

English-translation of Office Action in counterpart Japanese Application No. 2010-149074 dated Dec. 2, 2016, pp. 1-4.
Office Action Issued in JP Patent Application No. 2010-149074, Dated Apr. 8, 2014, Provided with English Translation, 5 pages. Previously submitted in Parent application.
First Office Action and Search Report, Chinese Patent Agent, CN application 201010256848.2 dated Feb. 11, 2014, 24 pages. Previously submitted in Parent application.
European Patent Office, EP Search Report from corresponding European Patent Application No. 10167900.9-2413, dated Dec. 8, 2010, (total 4 pgs.) Previously submitted in Parent application.
European Written Exam in related EP Application 10167900.9, dated Feb. 24, 2016, 4 pages.
Office Action in counterpart Japanese Application No. 2010-149074 dated Apr. 4, 2017, pp. 1-5 [U.S. Pat. No. 7,093,760 previously cited].
English-translation of Office Action in counterpart Japanese Application No. 2010-149074 dated Apr. 4, 2017, pp. 1-5.
Sakanashi et al. "ZigBee, the latest technology that motivates enterprise; The technique for short-range wireless communication that allows a long-term operation that lasts several years by use of a dry cell battery; There is a symptom of the spread of the technique in the filed of a sensor network", Nikkei Communications, No. 485, Apr. 15, 2007, Nikkei Business Publications, Inc., Tokyo, Japan, pp. 62-67 [Cited in JP Office Action].

* cited by examiner

UNIVERSAL CONNECTIVITY FOR NON-UNIVERSAL DEVICES

CROSS-REFERENCE TO RELATED APPLICATIONS

The present application claims the benefit of U.S. patent application Ser. No. 14/566,070 for Universal Connectivity for Non-Universal Devices filed Dec. 10, 2014 (and published Apr. 9, 2015 as U.S. Patent Publication No. 2015/0099557), now U.S. Pat. No. 9,332,531, which claims the benefit of U.S. patent application Ser. No. 12/825,714 for Universal Connectivity for Non-Universal Devices filed Jun. 29, 2010 (and published Jan. 6, 2011 as U.S. Patent Application Publication No. 2011/0004870), now U.S. Pat. No. 8,914,788, which claims the benefit of U.S. Patent Application No. 61/222,284 for Universal Connectivity for Non-Universal Devices filed Jun. 1, 2009. Each of the foregoing patent applications, patent publications, and patents is hereby incorporated by reference in its entirety.

BACKGROUND

Data collection devices are a class of device used to collect, process, and transfer data to a data processing system. Data collection devices may be provisioned with one or more of a variety of data collection sub-systems including: imager, laser scanner, RFID scanner, and magnetic media scanner. Such sub-systems generally scan some data bearing device such as dataforms (e.g. barcodes), magnetic stripes, and RFID tags. The collected data is processed within the data collection device by a processor and associated circuits. The type and amount of processing may vary depending on the class of device, but usually includes, at a minimum, decoding the output of the data collection sub-system to generate a string of data corresponding to the encoded data contained within the data bearing device. The decoded data is then generally transferred to a terminal device (such as a cash register) using a primary communication path. This communication path may be one of any number of wired and wireless communication paths, such as 802.11, cellular, IrDA, USB, serial and parallel paths.

Although the conventional data transfer process outlined above is sufficient for normal day-to-day operation of the data collection device, difficulties arise when the process is extended to grant additional functionality to the data collection devices. In several implementations, the primary communication path is one-way—data can be transferred from the data collection device to the terminal device, but not from the terminal device to the data collection device. Features of the data collection device requiring a downstream channel from the terminal device to the data collection device, such as remote monitoring, software updating, or real-time licensing, cannot be implemented. In addition, although other primary communication paths are two-way, these communication paths may have limited bandwidth, such that implementing additional features to take advantage of the two-way communication path would limit the primary functions of the data collection device.

Updating hardware or software on the data collection device highlights the problems of the conventional system. In the conventional system, when the software or hardware on a portable data terminal needs to be updated, every portable data terminal must be manually updated. Data collection devices employing one-way communication paths cannot be updated automatically because the data cannot be transferred to the data collection device. Similarly, bandwidth limitations or implementation decisions (such as security concerns) limit the use of two-way communication paths for this purpose. Since the data cannot be automatically transferred, each data collection device must be manually updated. Although the updating process is not difficult for small enterprises with few data collection devices, the process is time-consuming and inefficient for large enterprises that may have hundreds or thousands of data collection devices requiring updates. A system that eliminates the problem of limited bandwidth and difficulty in communicating with the data collection device would be desired.

SUMMARY

Aspects of the present invention provide a system in which a central connectivity point is connected to at least one data collection device via a secondary communication channel that does not interfere with a primary communication channel, thereby allowing administration of the data collection devices without adding functionality to an existing primary communication channel.

According to an aspect of the present invention, a system is provided, including at least one data collection device, each connected to a corresponding data terminal via a primary communication channel; and a central connectivity point connected to each data collection device via a wireless secondary communication channel so as to communicate with the at least one data collection device without disrupting communication between the at least data collection device and the corresponding data terminal via the primary communication channel. Here, the central connectivity point remotely administers the at least one data collection device via the secondary communication channel.

According to another aspect of the present invention, a data collection device is provided. The data collection device includes a primary communication interface to communicate with a data terminal via a primary communication channel; a secondary communication interface to communicate with a central connectivity point via a wireless secondary communication channel without affecting communication via the primary communication interface, so as to allow remote administration of the data collection device by the central connectivity point; a controller to control operation of the data collection device and to respond to commands received from the central connectivity point; a first memory to store information related to communications with the data terminal; and a second memory other than the first memory to store information related to communications with the central connectivity point.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1A:
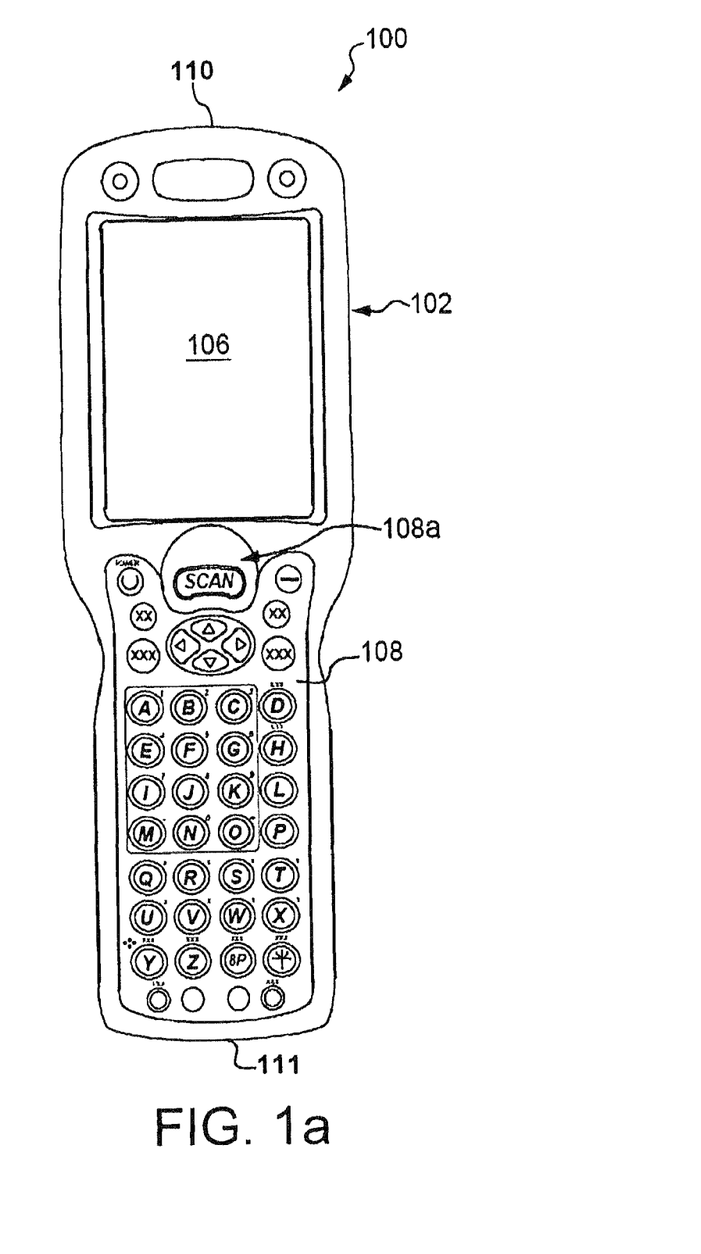
FIGS. 1a and 2a illustrate a conventional portable data terminal (PDT)
Figure 1B:
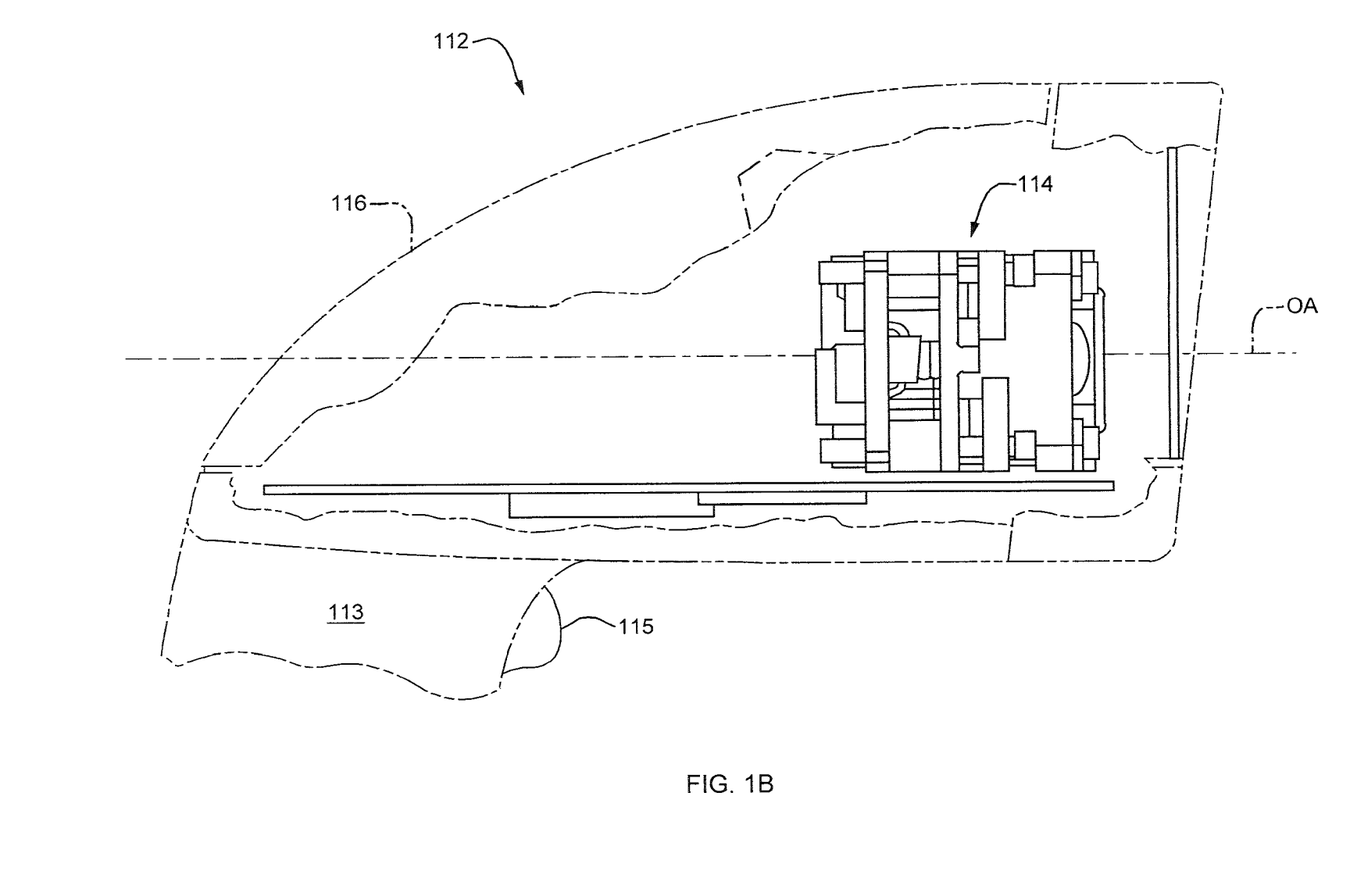
FIGS. 1B and 2b illustrate a conventional hand held bar code scanner.
Figure 2A:
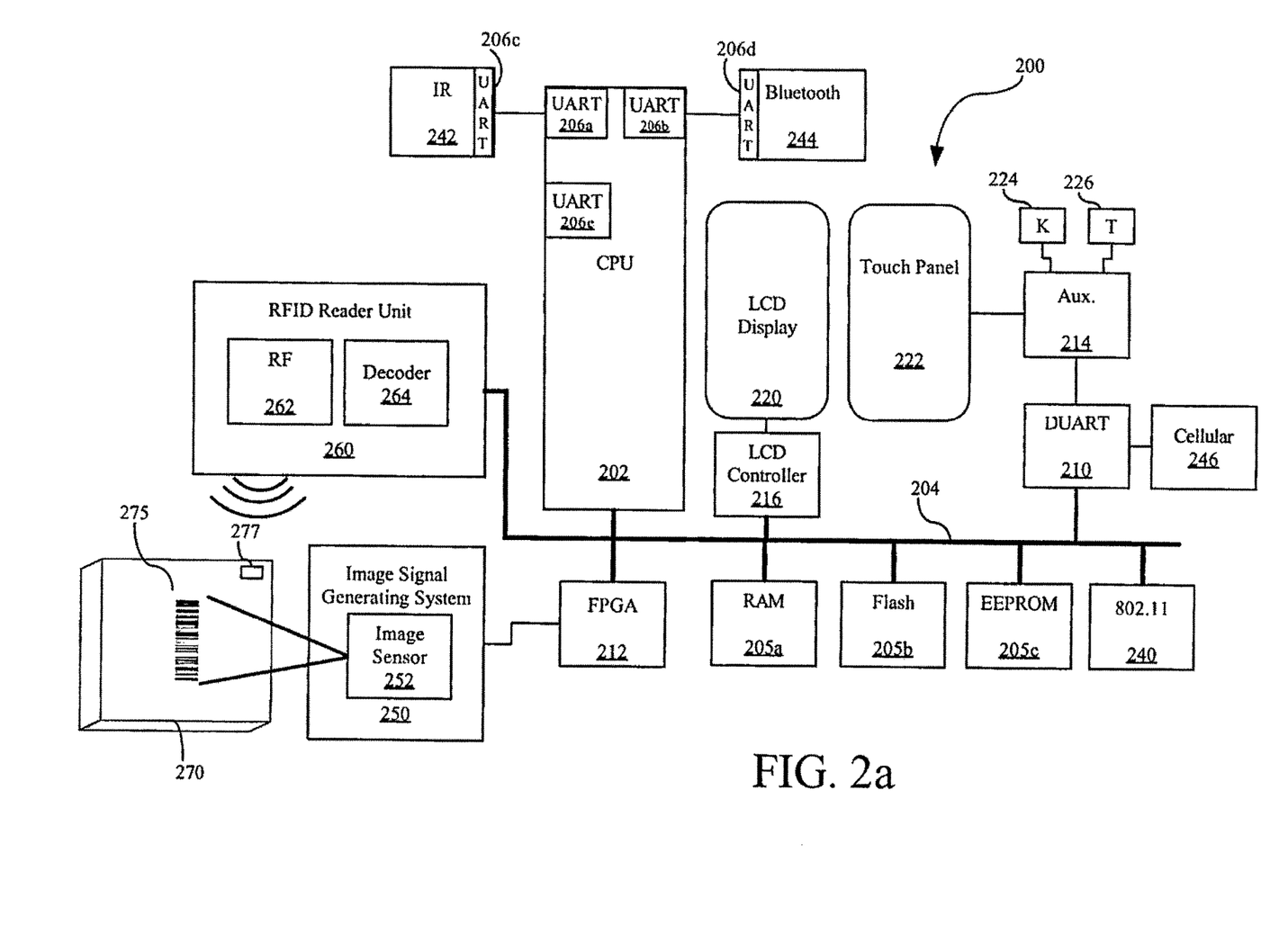
Figure 2B:
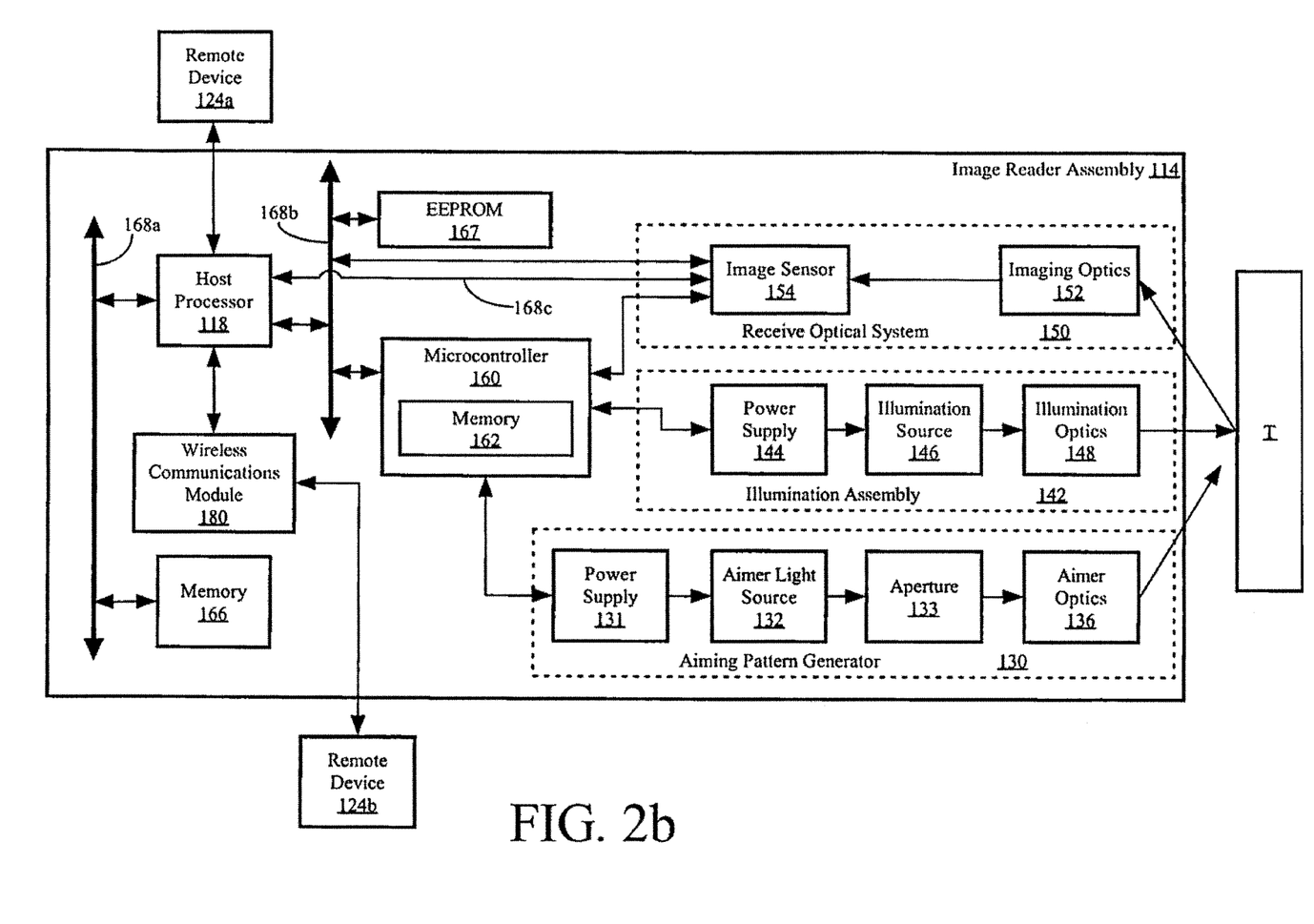

FIGS. 1a, 1B, 2a, and 2b illustrate two types of data collection devices; PDTs (FIGS. 1a and 2a) and hand held bar code scanners (FIGS. 1B and 2b). When viewed at a systems level, PDTs and hand held bar code scanners illustrate the variety of sub-systems utilized by data collection devices, with fixed and mobile systems being generally more complicated than hand held bar code scanners but perhaps not quite as complex as PDTs. As such, while the following discussion focuses on PDTs and hand held bar code scanners, the described embodiments of the present invention encompass all data collection devices.

PDTs generally integrate a mobile computer, one or more data transport paths and one or more data collection subsystems. The mobile computer portion is generally similar to known touch screen consumer oriented portable computing devices (e.g. "Pocket PCs" or "PDAs"), such as those available from PALM, HEWLETT PACKARD, and DELL. The data transport paths include wired and wireless paths, such as 802.11, IrDA, BLUETOOTH, RS-232, USB, CDMA, GSM (incl. GRPS), and so forth. The data collection subsystem generally comprises a device that captures data from an external source, for example, touches, keystrokes, RFID signals, images, and bar codes. PDTs further distinguish from consumer oriented portable computing devices through the use of "industrial" components integrated into a housing that provide increased durability, ergonomics, and environmental independence over consumer oriented devices. Additionally, PDTs tend to provide improved battery life by utilizing superior batteries and power management systems. PDTs are available from several sources, including Honeywell (formerly Hand Held Products), the assignee of the present application.

FIG. 1a is a plan view of a conventional PDT 100. The PDT 100 utilizes an elongated water resistant body 102 supporting a variety of components, including: a battery (not illustrated); a touch screen 106 (generally comprising a LCD screen under a touch sensitive panel); a keypad 108 (including a scan button 108a); a scan engine (not illustrated); and a data/charging port (also not illustrated). The scan engine may comprise, for example, one or more of an image engine, a laser engine, or an RFID engine. The scan engine is generally located near a top end 110 of the PDT 100. The data/charging port typically comprises a proprietary mechanical interface with one set of pins or pads for transmitting and receiving data (typically via a serial interface standard such as USB or RS-232) and a second set of pins or pads for receiving power for operating the system and/or charging the battery. The data charging port is generally located near a bottom end 111 of the PDT 100.

In use, the user presses the scan key 108a to initiate data capture via the scan engine. The captured data is analyzed, e.g., decoded to identify the information represented, stored and, displayed on the touch screen 106. Additional processing of the data may take place on the PDT 100 and/or an external data processing resource to which the data is transmitted.

FIG. 2a is a block diagram of a conventional PDT 200. A central processing unit (CPU) 202 receives data from and outputs data to other sub-systems for storage, transmission, and additional processing. The CPU 202 typically comprises one or more of a number of off-the-shelf solutions including: embedded processors, such as an XSCALE® processor available from MARVELL® TECHNOLOGY GROUP; general purpose processors, such as a PENTIUM® 4 available from INTEL®; or any number of custom solutions including pre-configured field programmable gate arrays (FPGAs) and application specific integrated circuits (ASICs). Overall operation of the CPU 202 is controlled by software or firmware (typically referred to as an operating system) stored in one or more memory locations 205n, such as: RAM 205a; FLASH memory 205b; and EEPROM 205c. Examples of suitable operating systems for the PDT 200 include graphical user interfaces such as WINDOWS MOBILE®, WINDOWS® CE, WINDOWS® XP, LINUX, PALM®, and OSX operating systems.

In general, communication between the CPU 202 and the various sub-components takes place via one or more ports or busses, including a main system bus 204; a plurality of Universal Asynchronous Receiver/Transmitter (UART) ports 206n; and a Dual Universal Asynchronous Receiver/Transmitter (DUART) 210.

A variety of secondary processors may be provided to perform general and application specific functions. The example illustrated in FIG. 2a provides three such processors: a field programmable gate array (FPGA) 212; an auxiliary processor 214; and an LCD controller 216. The FPGA 212 may comprise any number of FPGAs including the Virtex-4 family of FPGAs available from XILINX. The FPGA 212 is used to interface with one or more data acquisition systems as described hereinafter. The auxiliary processor 214 may comprise any number of embedded (or general purpose) processors, including the PICmicro® family of microcontrollers available from MICROCHIP TECHNOLOGY. The auxiliary processor 214 interfaces with and controls a variety of data input devices including, for example a touch sensitive panel 222, a keypad 224, and a scan key or trigger 226. The LCD controller 216 may comprise any number of available controllers including, for example, one of the available EPSON LCD controllers. As its name and connections suggest, the LCD controller 216 controls the display of images on an LCD display 220, such as any number of displays available from SHARP. The combination of the LCD 220 and the touch sensitive panel 222 is often referred to as a "touch screen."

The PDT 200 may further include a plurality of communication links such as an 802.11 communication link 240, an IR communication link 242, a Bluetooth communication link 244, and a cellular communication link 246 for communication with a cellular network such as a network in accordance with the Global System for Mobile Communications (GSM) network. The 802.11 communication link 240 interfaces with the CPU 202 via the main system bus 204. The IR communication link 242 and the Bluetooth communication link 244 are connected to the CPU 202 via UART channels 206n. The cellular communication link 246 is connected to the CPU 202 via the DUART 210. Wired communication may be conducted via a UART, such as the UART 206e.

The PDT 200 may be configured to activate a data collection subsystem based on the actuation of a key on the keypad 224 (including the trigger 226) or a touch on the touch panel 222. In addition to the touch panel 222 and keyboard 224, a variety of suitable data collection subsystems may be integrated into the PDT 200. In the example shown in FIG. 2a, two such systems are illustrated: an image signal generation system 250 and an RFID reader unit 260. Data acquisition subsystems may be controlled with either the main CPU 202 or a secondary processor. For example the image signal generation system 250 is illustrated as being controlled by the FPGA 212. Possible configurations of the FPGA 212 are illustrated in U.S. Pat. No. 6,947,612 incorporated herein by reference. As another example, the RFID reader unit 260 is illustrated as being controlled, via the system bus 204, by the CPU 202.

The image signal generating system 250 generally comprises a two dimensional solid state image sensor 252 (such as a CCD, a CMOS, or a CID) for capturing an image containing data, e.g. an, image, a bar code, or a signature. Two-dimensional solid state image sensors generally have a plurality of photo sensor picture elements ("pixels") which are formed in a pattern including a plurality of rows and a plurality of columns of pixels. The image signal generating system 250 further includes imaging optics (not shown) focusing an image onto an active surface of the image sensor 252. The image sensor 252 may be incorporated on an image sensor IC chip having disposed thereon image sensor control circuitry, image signal conditioning circuitry, and an analog-to-digital converter. The FPGA 212 manages the capture and transfer of image data into memory 205n. Possible configurations of the FPGA 212 are illustrated in U.S. Pat. No. 6,947,612 incorporated herein by reference. Decoding may be performed by the CPU 202 or any suitable secondary processor. Examples of suitable image signal generation system 250 include the 5000 2D engine series available from Honeywell (formerly Hand Held Products), assignee of the present application, such as the 5X00 and 5X80 engines.

One use of the image signal generating system 250 is reading and interpreting bar codes such as bar code 275 on an item 270. In this mode, when the trigger button 226 is actuated, the CPU 202 causes the appropriate control signals to be sent to the image sensor 252. In response thereto, the image sensor 252 outputs digital image data including a representation of the bar code symbol 275. This data is acquired by the FPGA 212 where it is collected and subsequently transferred to the memory 205a. In accordance with a decoding program (not specifically illustrated but typically executed by either the FPGA 212 or the CPU 202) an attempt may be made to decode the bar code represented in the captured digital image representation. The capture and decoding of image data may occur automatically in response to a trigger signal being generated by activation of the trigger 226. For example, the CPU 202 may be configured, typically through execution of a program resident in the memory 205a, to continuously capture and decode bar code symbols represented therein until either a successful decode is completed or the trigger 226 is released. The cycle may also be terminated by timing out after a number of unsuccessful decode attempts.

In addition to having a decode mode of operation, the image signal generation system 250 may also be configured for an image capture mode of operation. In an image capture mode of operation, an electronic image representation is captured without attempting a decode. It is also possible to capture an image including a bar code and then decode the bar code, with or without making use of the non-bar code area of the captured image. The captured electronic image representation may be one or more of (i) stored into a designated memory location of the memory 205a, (ii) transmitted to an external device, or (iii) displayed on the LCD 220. This mode may be used to capture, for example an image of a signature or damage to a package.

The RFID reader unit 260 includes an RF oscillation and receiver circuit 262 and a data decoder 264. The RFID reader unit 260 may be configured to read RF encoded data from a passive RFID tag, such as a tag 277, which may be disposed on the item 270. In such a case, the RF oscillation and receiver circuit 262 transmits a carrier signal to the passive tag which in turn converts the carrier energy to voltage form and actuates a transponder (not shown) to transmit a radio signal representing the encoded tag data. The RF oscillator and receiver circuit 262, in turn, receives the radio signal from the tag and converts the data into a digital format. The data decoder 264, typically including a low cost microcontroller IC chip, decodes the received radio signal information received by the RF oscillator and receiver circuit 262 to decode the encoded identification data originally encoded into the tag 277.

The RFID reader unit 260 may, for example, operate in a selective activation mode or in a continuous read operating mode. In a selective activation mode, the RFID reader unit 260 broadcasts radio signals in an attempt to activate a tag or tags in its vicinity in response to an RFID trigger signal being received. In a continuous read mode, the RF oscillation and receiver circuit 262 continuously broadcasts radio signals in an attempt to actuate a tag or tags in proximity to the PDT 200 automatically, without receiving a trigger signal. The PDT 200 may be configured so that the CPU 202 recognizes a trigger signal under numerous conditions, such as: (1) actuation of the trigger 226; (2) receipt of an RFID trigger instruction (for example generated by a software program); or (3) a determination that some other predetermined condition has been satisfied.

Referring to FIGS. 1B and 2b, the exemplary hand held bar code scanner 112 (referred to as "scanner 112") has a number of subsystems for capturing images and decoding dataforms within such images. The scanner 112 has an imaging reader assembly 114 provided within a head portion or a housing 116 connected to a handle portion 113. A trigger 115 is used to control operation of the scanner 112. The head portion 116 has a medial plane MP selected so that the scanner 112 is held with the head portion generally horizontal. The medial plane MP should generally be perpendicular to the face of the scanning head 116, as operators have a tendency to hold the medial plane of the head portion of the imager approximately normal to the plane of the target when collecting data.

Referring to FIG. 2b, the image reader assembly 114 generally comprises a read optical system 150, an illumination assembly 142, an aiming pattern generator 130 and a variety of control and communication modules. The read optical system 150 generates frames of data containing indications of the intensity of light received by the read optical system 150. The illumination assembly 142 illuminates a target T creating reflections that are received by the read optical system 150. The aiming pattern generator 130 projects an aiming light pattern to assist with aiming the scanner 112. While the present description employs an imager based data collection subsystem (the image reader assembly 114), it is to be recognized that the data collection subsystem may take other forms, such as a laser scanner.

The read optical system 150 generally comprises imaging receive optics 152 and an image sensor 154. The imaging receive optics 152 receives light reflected from a target T and projects the reflected light on to the image sensor 154. The image sensor 154 may comprise any one of a number of two-dimensional, color or monochrome solid state image sensors using such technologies as CCD, CMOS, NMOS, PMOS, CID, CMD, etc. One possible sensor is the MT9V022 sensor from Micron Technology Inc. Such sensors contain an array of light sensitive photodiodes (or pixels) that convert incident light energy into electric charges.

Many image sensors are employed in a full frame (or global) shutter operating mode, wherein the entire imager is reset prior to an image capture operation to remove any residual signal in the photodiodes. The photodiodes (pixels) then accumulate charge for some period of time (exposure period), with the light collection starting and ending at about the same time for all pixels. At the end of the integration period (time during which light is collected), all charges are simultaneously transferred to light shielded areas of the sensor to prevent further accumulation of charge during the readout process. The signals are then shifted out of the light shielded areas of the sensor and read out. It is also known to employ a rolling shutter.

The illumination assembly 142 generally comprises a power supply 144, illumination sources 146, and illumination optics 148. The illumination optics 148 directs the output of the illumination sources 146 (generally comprising LEDs or the like) onto the target T. The light is reflected off the target T and received by the read optical system 150. It is to be noted that the illumination provided by the illumination assembly 142 may be combined with (or replaced by) other sources of illumination, including ambient light, from sources outside of the scanner 112.

The aiming pattern generator 130 generally comprises a power supply 131, light source 132, aperture 133, and optics 136. The aiming pattern generator 130 creates an aiming light pattern projected on or near the target which spans a portion of the receive optical system's 150 operational field of view with the intent of assisting the operator to properly aim the scanner at the bar code pattern that is to be read. A number of representative generated aiming patterns are possible and not limited to any particular pattern or type of pattern, such as any combination of rectilinear, linear, circular, elliptical, etc., figures, whether continuous or discontinuous, i.e., defined by sets of discrete dots, dashes, and the like. Alternately, the aimer pattern generator may be a laser pattern generator.

Generally, the aiming light source 132 may comprise any light source which is sufficiently small or concise and bright to provide a desired illumination pattern at the target. For example, the light source 132 may comprise one or more LEDs, such as part number NSPG300A made by Nichia Corporation. Illumination and aiming light sources with different colors and combination of colors may be employed, for example white, green and red LEDs. The colors may be chosen based on the color of the symbols most commonly imaged by the image reader. Different colored LEDs may be each alternatively pulsed at a level in accordance with an overall power budget.

The light sources 132 may also be comprised of one or more laser diodes such as those available from Rohm. In this case, a laser collimation lens (not shown in these drawings) will focus the laser light to a spot generally forward of the scanning head and approximately at the plane of the target T. This beam may then be imaged through a diffractive interference pattern generating element, such as a holographic element fabricated with a desired pattern in mind. Examples of these types of elements are known, commercially available items and may be purchased, for example, from Digital Optics Corp. of Charlotte, N.C., among others.

A host processor 118 provides overall control of the image reader assembly 114. The host processor 118 and other components of the image reader assembly are generally connected by one or more buses 168n and/or dedicated communication lines. In the illustrated example, a parallel bus 168a connects the host processor 118 to a main system memory 166 used to store processed (and unprocessed) image data from the image sensor 154. The host processor utilizes an I2C bus 168b to communicate exposure settings to the image sensor 154 and illumination parameters to a microcontroller 160. A dedicated 8 to 10 bit parallel bus 168c is used to transfer image data from the image sensor 154 to the host processor 118. The width of the bus 168c may be dependent on the bit size recorded by each pixel in the image sensor 154. The output of the image sensor 154 is processed by a host processor 118 utilizing one or more functions or algorithms to condition the signal appropriately for use in further processing downstream, including being digitized to provide a digitized image of target T.

Another function of the host processor 118 is to decode machine readable symbology represented within an image captured by the image sensor 154. Information respecting various reference decode algorithms is available from various published standards, such as by the International Standards Organization ("ISO").

The microcontroller 160 maintains illumination parameters, used to control operation of the illumination assembly 142 and the aiming pattern generator 130, in a memory 162. For example, the memory 162 may contain tables indicative of power settings for the power supply 144 and 131 corresponding to various states of the signal from the image sensor 154. Based upon signals from the host processor 118 and/or the image sensor 154, the microcontroller 160 sends signals to the power supplies 131 and 144 based on values stored in the table in memory 162. An exemplary microcontroller 160 is the CY8C24223A made by Cypress Semiconductor Corporation.

The image reader assembly 114 may be provided with one or more communication paths for communicating with remote devices 124a, such as networks, network interfaces (e.g. routers hubs and switches), other scanners, data collection devices, computers, or data storage devices (e.g. hard drives). In general, such communications paths are either wired or wireless and may either be integrated with the host processor 118 or implemented as one or more separate modules. In the example illustrated in FIG. 2B, a wired connection, such as UARTS, USB, serial, parallel, scan wedge, or Ethernet, is shown as being integrated with the host processor 118. On the other hand, a wireless connection, such as IrDA, BLUETOOTH, GSM, GPRS, EDGE, and 802.11, is illustrated as being implemented via a wireless communication module 180.

Figure 3:
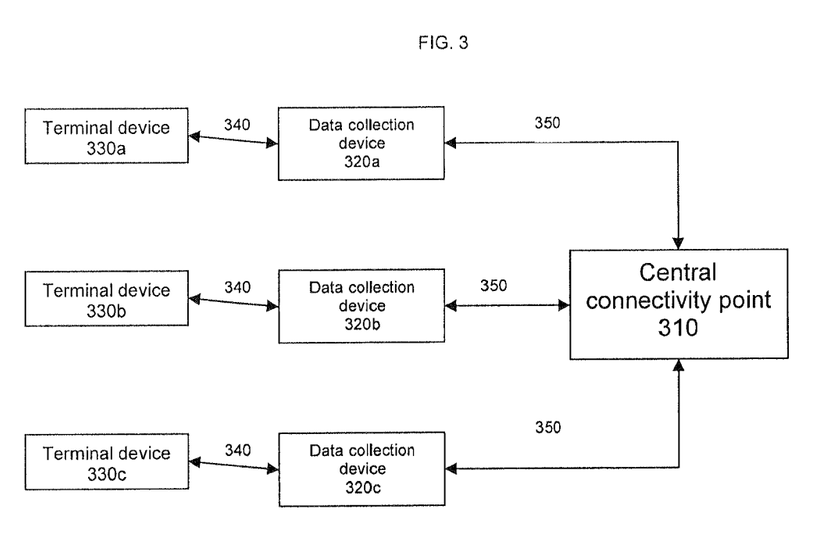
FIG. 3 is a diagram of a system according to an embodiment of the present invention.

FIG. 3 shows a system 300 according to an embodiment of the present invention. The system 300 includes a central connectivity point 310 and a plurality of data collection devices 320a, 320b, and 320c. Each of the data collection devices 320a, 320b, and 320c are connected to a terminal device 330a, 330b, and 330c, respectively. The data collection devices 320a, 320b, and 320c may include, for example, the features of the PDTs 100 and 200 shown in FIGS. 1a, 1B, 2a, and 2b. The central connectivity point 310 is connected to the data collection devices 320a, 320b, and 320c via a wireless secondary communication channel 350. Each of the data collection devices 320 is connected to the corresponding terminal device 330a, 330b, or 330c via a primary communication channel 340a, 340b, and 340c, respectively. According to other aspects of the invention, the system 300 may include additional components, such as a server communicating with one or more of the terminal devices 330a, 330b, and 330c.

The data collection devices 320a, 320b, and 320c are connected to the corresponding terminal device 330a, 330b, or 330c via the corresponding primary communication channel 340a, 340b, or 340c. The primary communication channels 340a, 340b, and 340c may be a one-way or two-way communication channel, and may be used in day-to-day operations of the portable data terminal 320. The primary communication channel 340a, 340b, and 340c may be a wired or wireless communication channel, such as the communication channels shown in FIG. 2b. Depending on the architecture of the terminal devices 330a, 330b, and 330c, the individual primary communication channels 340a, 340b, and 340c may not share the same technology. For example, the primary communication channel 340a may be USB, while the primary communication channel 140c may be RS-232. If, for example, the primary communication channel 340b is a one-way communication channel, data may only be transferred from the data collection device 320b to the terminal device 330b. Security concerns may also limit the data that may be transmitted via the primary communication channels 340a, 340b, and 340c.

The data collection devices 320a, 320b, and 320c are connected to the central connectivity point (CCP) via the secondary communication channel 350. The secondary communication channel 350 is a wireless communication channel that may employ any available wireless technology, such as ZigBee, Bluetooth, or Wi-Fi. ZigBee is a wireless solution that can be added to existing portable data terminals at low cost. The secondary communication channel 150 allows the data collection devices 320a, 320b, and 320c to communicate with the central connectivity point 110 without significantly impacting any concurrent communications with the corresponding terminal device 330a, 330b, or 330c via the primary communication channel 340. ZigBee is an inexpensive wireless solution with a fairly large range that can be easily incorporated into existing data collection devices. In addition, ZigBee supports a relay system that can further extend the range of the secondary communication channel 350.

The central connectivity point 310 may communicate with the data collection devices 320a, 320b, and 320c using the secondary communication channel 350. Although the central connectivity point could communicate via the primary communication channel 340, the purpose of the primary communication channel, as discussed above, is to communicate with the corresponding terminal devices 330a, 330b, and 330c. The primary communication channel may not be able to handle data transfer between the central connectivity point, due to limited bandwidth or the network implementation. The secondary communication channel 350, in contrast, is designed to allow dedicated communication between the data collection devices 320a, 320b, and 320c and the central connectivity point 310. This permits aspects of the system 300 to be incorporated into, or on top of, existing networks without an extensive redevelopment.

The central connectivity point 310 administers the data collection devices 320a, 320b, and 320c. Administration functions may include providing software updates to the data collection devices, monitoring the data collection devices, or providing real-time licenses to the data collection devices so as to allow a user to operate features of the data collection devices corresponding to the licenses. Especially in the case of remote monitoring and software updating, the central connectivity device 310 enables the administration of the data collection devices 320a, 320b, and 320c simultaneously, instead of requiring a technician to perform these tasks individually for each data collection device.

A variety of functions may be implemented via the system 300. For example, the data collection devices 320a, 320b, and 320c may all have the same software or hardware features, but not all of these features may be needed for a particular job. The central connectivity point 310 may implement a real-time license system, in which licenses are transmitted to the portable data terminals 320a, 320b, and 320c when needed, to activate corresponding software or hardware features. An enterprise implementing the system 300 would not need to deploy different types or configurations of data collective devices; instead, the same type or configuration may be deployed throughout the system and different software and hardware features may be selectively enabled and disabled as needed. This standardization can reduce conflicts and reduce deployment and support costs.

The system 300 also supports seamless updating of the data collection devices 320a, 320b, and 320c. Previously, each data collection device would need to be updated manually, a time-consuming and expensive task that would require the data collection device to be taken out of service while the upgrade was performed. However, using the secondary communication channel 350, the central connectivity point 310 may download software updates to each of the data collection devices 320a, 320b, and 320c in the background, during normal operation. The only disruption would occur if the upgrade requires a restart. The restart process, however, would only require a few minutes of downtime, and this downtime could occur whenever the operator wishes. Upgrading may also occur outside of normal work hours, in which case the downtime would not be noticeable.

Figure 4:
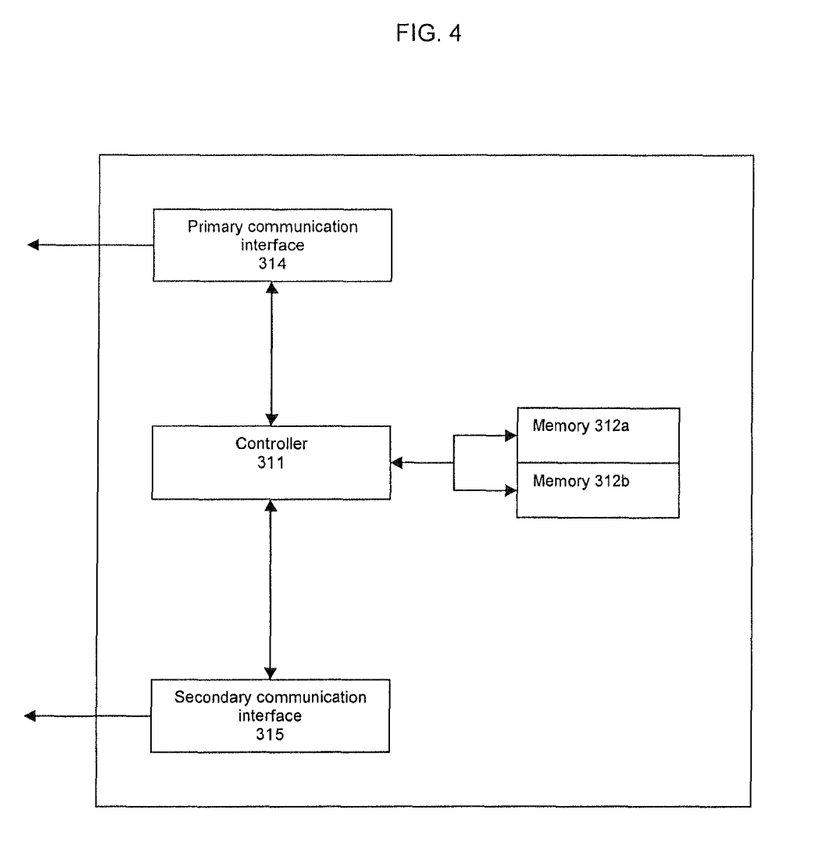
FIG. 4 is a diagram of a data collection device according to an embodiment of the present invention.

FIG. 4 shows the data collection device 320a according to an embodiment of the present invention; the data collection devices 320b and 320c may be configured in similar fashion. The data collection device 320a includes a primary communication interface 314, a secondary communication interface 315, and a controller 311. The primary communication interface 314 and the secondary communication interface 315 are communication interfaces for the primary communication channel 340 and the secondary communication channel 350, respectively. The secondary communication interface 315 may also serve as a relay to connect other data collection devices that are outside the range of the central connectivity point 310. The controller 311 controls operations of the data collection device 320a. According to other aspects of the invention, the data collection device 320a may include additional and/or different components, depending on the nature of the data collection device 320a. For example, the data collection device 320a may also include an input/output unit, additional software features, and/or a storage unit. Similarly, the functionality of two or more of the above units may be integrated into a single component; for example, the primary communication interface 314 may be integrated with the secondary communication interface 315 so that a single communication interface handles communications via both the primary communication channel 340 and the secondary communication channel 350.

The data collection device 320a may also include, as shown in FIG. 4, a first memory 312a and a second memory 312b. The first and second memories 312a and 312b may be used where data being used for normal operations of the portable data terminal 320 should not be commingled with data being transmitted to, or received from, the central connectivity point 310. Such a situation could arise, for example, when the central connectivity point 310 is downloading a software upgrade to the portable data terminal 320 in the background, while the data collection device 320a is otherwise operating normally. Since the software upgrade could affect the operation of the data collection device 320a, the controller 311 can store the software upgrade received from the central connectivity point 310 in the second memory 312b while the portable data terminal operates using the first memory 312a. The controller 311 may then complete the upgrade using the data stored in the second memory 312b while the portable data terminal 320 is not being used. This facilitates seamless background downloading of data without disrupting operations of the data collection device 320a. The operator of the data collection device 320a need not even be aware that background downloading is occurring.

In addition to software upgrades and real-time license management, both examples of downloading data to the data collection device 320a from the central connectivity point 310, the system 300 may also be employed for real-time monitoring of the data collection device 320a. This real-time monitoring capability may be used to determine whether the data collection device 320a requires updating, to monitor the use of the data collection device 320a, or to diagnose problems with the data collection device 320a. If the data collection device 320a is experiencing problems, a technician does not need to go on-site to diagnose the issue. Instead, the technician may access the data collection device 320a remotely via the secondary communication channel 350 to examine the data collection device 320a and determine the cause of the problem. The monitoring capability may also be used to, for example, compile usage statistics about the data collection device 320a or to track unauthorized use of the data collection device 320a.

Figure 5:
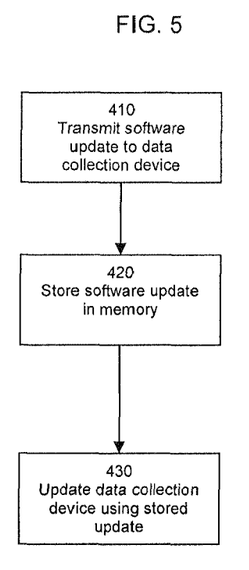
FIG. 5 is a diagram of a process of updating a data collection device, according to an embodiment of the present invention.

FIG. 5 is a flowchart of a software update process performed using the system 300, according to an embodiment of the present invention. In operation 410, the central connectivity point 310 transmits the software update to the data collection device 320a via the second communication channel 350. Prior to transmitting the data, the central connectivity point 310 may first request information from the data collection device 320a to determine whether the software update is necessary, and proceed with the software update process only if the information received from the data collection device 320a indicates that the software update is needed. The central connectivity point 310 may be connected to the Internet and obtain the software update from a remote site, such as the manufacturer of the data collection device 120a.

In operation 420, the controller 311 receives the software update from the central connectivity point 310 and stores the software update in memory. The controller may store the software update in the memory 312b, as shown in FIG. 4, so as to minimize disruption of the normal operations of the data collection device 320a. Operations 410 and 420 may be performed in the background, while the data collection device 320a performs normal operations using the primary communication channel 340.

In operation 430, the controller 311 updates the portable data terminal 320 using the software update stored in the memory. Operation 430 need not be performed immediately after the software update is received and stored in the memory. If the software update does not require disrupting normal operation of the data collection device 320a (for example, no restart is required, or the feature being updated is not being used), operation 410 may be performed once the software update is received from the central connectivity point 310. In other situations, the controller 311 may issue a prompt to the operator of the data collection device 320a indicating that a software update has been received. The operator may choose to install the update immediately, or may wait until a more convenient time. Instead of informing the operator, the controller 111 may instead wait until the data collection device 320a is not being used, such as at a predetermined time of day (for example, after the close of business) or when the portable data terminal has been idle for a predetermined time. The update may also be pre-scheduled to occur at a predetermined time.

Aspects of the present invention can also be embodied as computer readable codes on a computer readable recording medium. The computer readable recording medium is any data storage device that can store data which can be thereafter read by a computer system. Examples of the computer readable recording medium also include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing aspects of the present invention can be easily construed by programmers skilled in the art to which the present invention pertains.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A system, comprising:
   at least one data collection device comprising a processor and connected to a corresponding data terminal via a primary communication channel; and
   a central connectivity point connected to the at least one data collection device via a wireless secondary communication channel to communicate, via the wireless secondary communication channel, with the at least one data collection device without disrupting communication between the at least one data collection device and the corresponding data terminal via the primary communication channel;
   wherein the central connectivity point remotely administers the at least one data collection device via the wireless secondary communication channel while the at least data collection device is communicating with the corresponding data terminal via the primary communication; and
   wherein the central connectivity point transmits a license to the at least one data collection device, the license enabling use of at least one feature of the at least one data collection device, and the license being transmitted from the central connectivity point to the at least one data collection device when the at least one feature is needed.

2. The system of claim 1, wherein the wireless secondary communication channel is a two-way communication channel.

3. The system of claim 1, wherein the central connectivity point monitors a status of the at least one data collection device via the wireless secondary communication channel.

4. The system of claim 1, wherein the central connectivity point updates the at least one data collection device via the wireless secondary communication channel.

5. The system of claim 1, wherein:
the at least one data collection device comprises a plurality of data collection devices; and
the central connectivity point communicates with the plurality of data collection devices so as to remotely administer the plurality of data collection devices substantially simultaneously.

6. The system of claim 1, wherein the at least one data collection device comprises a single communication interface for handling communications via the primary communication channel and the secondary communication channel.

7. A system, comprising:
at least one data collection device comprising a processor and connected to a corresponding data terminal via a primary communication channel; and
a central connectivity point connected to the at least one data collection device via a wireless secondary communication channel to communicate, via the wireless secondary communication channel, with the at least one data collection device without disrupting communication between the at least one data collection device and the corresponding data terminal via the primary communication channel;
wherein the central connectivity point remotely administers the at least one data collection device via the wireless secondary communication channel while the at least one data collection device is communicating with the corresponding data terminal via the primary communication channel; and
wherein the secondary communication channel of the at least one data collection device connects another data collection device that is beyond the range of the central connectivity point to the central connectivity point.

8. The system of claim 7, wherein the wireless secondary communication channel is a ZigBee network.

9. The system of claim 7, wherein the central connectivity point monitors a status of the at least one data collection device via the wireless secondary communication channel.

10. The system of claim 7, wherein the central connectivity point updates the at least one data collection device via the wireless secondary communication channel.

11. The system of claim 7, wherein: the at least one data collection device comprises a plurality of data collection devices; and the central connectivity point communicates with the plurality of data collection devices so as to remotely administer the plurality of data collection devices substantially simultaneously.

12. The system of claim 7, wherein the at least one data collection device comprises a single communication interface for handling communications via the primary communication channel and the secondary communication channel.

13. A system, comprising:
at least one data collection device comprising a processor and connected to a corresponding data terminal via a primary communication channel; and
a central connectivity point connected to the at least one data collection device via a wireless secondary communication channel to communicate, via the wireless secondary communication channel, with the at least one data collection device without disrupting communication between the at least one data collection device and the at corresponding data terminal via the primary communication channel;
wherein the central connectivity point remotely administers the at least one data collection device via the wireless secondary communication channel while the at least one data collection device is communicating with the corresponding data terminal via the primary communication channel; and
wherein the central connectivity point compiles usage statistics and/or tracks unauthorized usage statistics regarding the at least one data collection device.

14. The system of claim 13, wherein the central connectivity point monitors a status of the at least one data collection device via the wireless secondary communication channel.

15. The system of claim 13, wherein the central connectivity point updates the at least one data collection device via the wireless secondary communication channel.

16. The system of claim 13, wherein: the at least one data collection device comprises a plurality of data collection devices; and the central connectivity point communicates with the plurality of data collection devices so as to remotely administer the plurality of data collection devices substantially simultaneously.

17. The system of claim 13, wherein the at least one data collection device comprises a single communication interface for handling communications via the primary communication channel and the secondary communication channel.

* * * * *